Oct. 13, 1953

T. A. HUTSELL 2,655,314

YARDAGE READING DEVICE FOR ATTACHMENT TO REVOLVING WHEELS

Filed Oct. 7, 1950

THOMAS A. HUTSELL
Inventor

By Smith & Tuck
Attorneys

THOMAS A. HUTSELL
Inventor

By Smith & Tuck
Attorneys

Oct. 13, 1953 — T. A. HUTSELL — 2,655,314
YARDAGE READING DEVICE FOR ATTACHMENT TO REVOLVING WHEELS
Filed Oct. 7, 1950 — 3 Sheets-Sheet 3
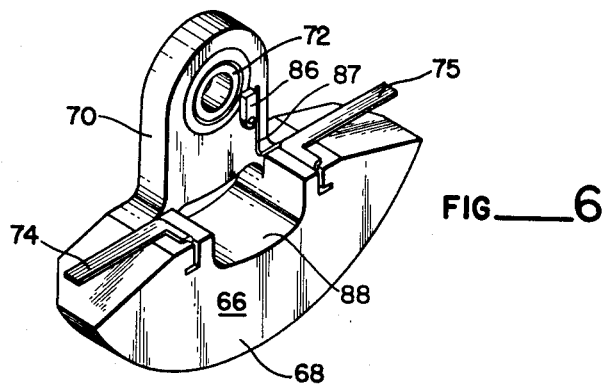
FIG. 6
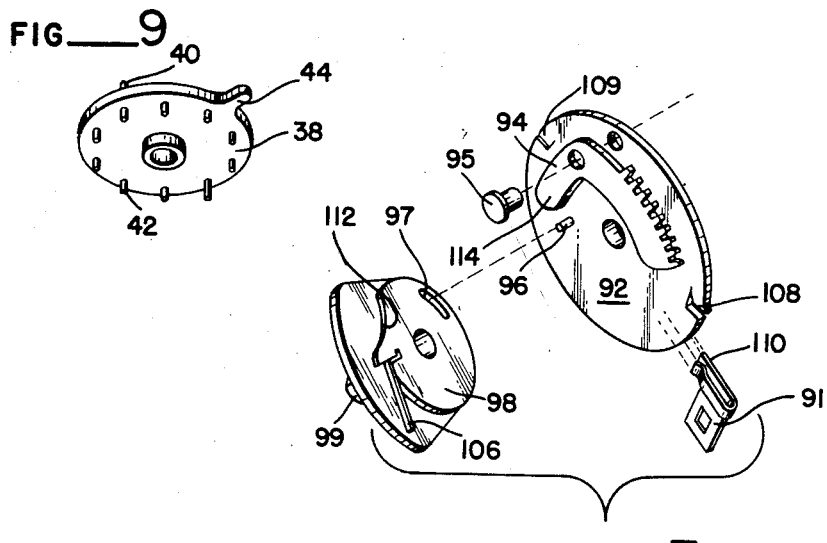
FIG. 9
FIG. 7
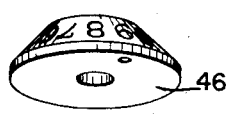
FIG. 8
THOMAS A. HUTSELL
Inventor
By Smith & Tuck
Attorneys Patented Oct. 13, 1953

2,655,314

UNITED STATES PATENT OFFICE 2,655,314

YARDAGE READING DEVICE FOR ATTACHMENT TO REVOLVING WHEELS

Thomas A. Hutsell, Renton, Wash.

Application October 7, 1950, Serial No. 188,994

5 Claims. (Cl. 235—95)

The present invention consists of a device capable of being attached to the wheel of a golf bag cart, in a coaxial position and in such a manner that revolution of the wheel in a forward direction advances the counter mechanism the amount proportional to the circumference of the wheel. The operation is effected by a pendulum operating through a pawl and ratchet assembly.

While there are many occasions where it is desired to measure a distance by means of a revolving wheel, this present invention is particularly designed to meet the need of golfers and to thus supply a means for measuring the distance of their drive or other shots, and also to measure the length of holes and record them in yards. Such a device may be easily attached or detached to the wheel of a golf bag cart without the use of tools.

Every game of golf is a contest where the player is pitting his skill in play against the other members of a twosome or foursome or he may be merely pitting his skill in effect against the established par of the course. Under such conditions there has long been a demand for a device that will determine the length for instance of a particularly fair hit ball whether it is a drive or one of the other club shots. To date there has been no convenient way of determining these distances accurately without the assistance of measuring equipment, which by the very nature of the game, the player could not carry around the course with him. In this present invention a very small compact device is provided which can be quickly secured to the wheel of a golf bag cart and thus a measuring device is always immediately available. This inventor lays no claim to be the originator of the idea of applying a wheel means for the measuring of the revolutions of the wheel. What has been done in this case is to provide a convenient means for such use which is so arranged internally that it can be adapted to wheels of various sizes and when so adapted will read the distances in actual yards. In the form shown in the drawings with three counting discs a total yardage of 999 can be indicated before the counting mechanism would repeat itself.

The principal object of this present invention is to provide a device which is compact and convenient to use and will enable a golfer to determine the yardage between any two points traversable by the wheel of his golf bag cart.

A further object of this invention is to provide a very compact computer which is economical to produce so that it can be enjoyed, as an accessory to a golf bag cart, by large numbers of people.

A further object of this invention is to provide a yardage counting meter in which the various internal parts are so constructed that the moving elements, normally having considerable shock effect upon the various other parts, have been cushioned so that the device can be expected to give useful service for a long period of time, and without any annoying noises as it is put in operation.

A further object of this invention is to provide a conveniently operated resetting mechanism so that each distance measured can be measured, starting at zero, so that no computations are involved in any way.

An important object of this invention is to provide a counting meter for a golf bag cart or the like which will count the distance traveled by the cart regardless of whether it is moved forward, backward, or alternately forward and backward.

Further objects, advantages and capabilities will be apparent from the description and disclosure in the drawings, or may be comprehended or are inherent in the device.

In the drawings:

Figure 6 is a perspective view showing the actuating pendulum of this device together with certain other parts associated therewith;

Figure 7 is a bracketed, exploded view showing certain other parts employed particularly in the resetting operation;

Figure 8 is a perspective view illustrating one of the number-indicating cones of which three are used in the form of device illustrated;

Figure 9 is a perspective view showing one of the actuating plates used to move the indicating cones.

Figure 1:
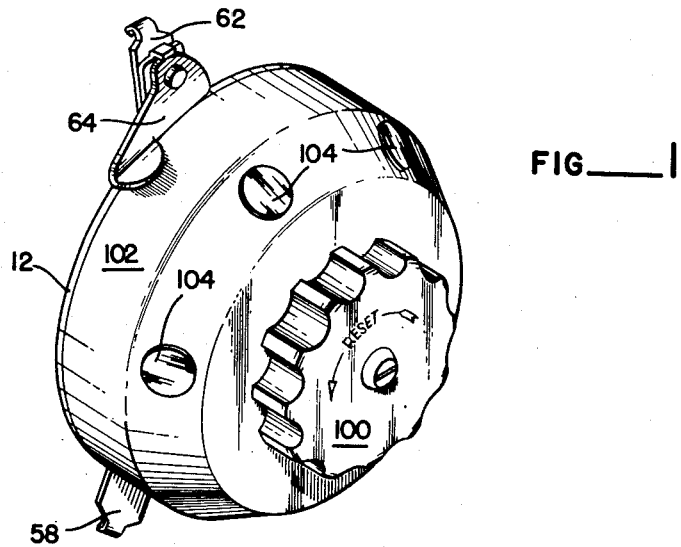
Figure 1 is a perspective view showing the outside appearance of this yardage meter.

Referring more particularly to the disclosure in the drawings, the numeral 12 indicates the base member of this device. In form the base is preferably circular and is provided with certain bosses and bearing shafts disposed at right angles to the plane of the base upon which are mounted the essential elements of the counting and indicating mechanism. The structure lends itself best to being formed as a unit as by die casting methods. However to meet manufacturing requirements the shafts of course may be independently secured to the base. Centrally disposed to the center of base 12 is the main shaft 14. Concentrically disposed around shaft 14 are the counter supporting shafts 16, 18 and 20. It is essential to have these shafts concentric with respect to shaft 14 in order that the resetting mechanism, which will be explained later, can be effectively operated from without the housing. Each of the shafts 16, 18 and 20 is formed with an enlarged boss portion which serves as a spacing member between base 12 and the mechanism disposed upon the shaft.

Revolvably positioned on shaft 14 is the drive pulley 22. This pulley is grooved to accept the elastic belt 24. Revolvably positioned on shaft 20 is the drive pulley 26 which is suitably grooved to accept the driving effort of belt 24. The ratio of pitch diameters of pulleys 22 and 26 must be adjusted in accordance with the size of the wheel to which the device is attached. The periphery of the driving wheel will measure a given distance on each revolution and the meter must convert into yards. Consequently it is necessary that means be provided, as by these two pulleys, so that by substitution of different sized pulleys the mechanism can be accurately accommodated to the diameter of the wheel to which it is attached. Fixedly secured to pulley assembly 26 as by means of a dowel 28 is the first digit counting cone 30 and to the counting cone in turn is fixedly secured the reset gear segment 32. Formed preferably as a part of pulley 26 is the actuating arm 34 which serves as the driving means for the second digit counting cone 36.

Cone 36 is free to revolve on its supporting shaft 18 and is fixed to driving plate 38 by means of dowel 40, which extends up into the base of cone 36. Depending downwardly from plate 38 which is probably best illustrated in Figure 9 are ten pins or detents as 42. These pins are properly positioned so as to operatively engage actuating arm 34 and to thus cause cone 36 to be moved around one-tenth of a revolution each time the first digit cone 30 makes one complete revolution. Plate 38 is provided with an actuating arm 44 which serves as a driving means for cone 46, which is the third digit counting cone and is free to revolve on shaft 16. Disposed in spaced relationship below cone 46 is the pin-carrying plate 48. This plate is the same as plate 38 except that here again there are equally spaced pins 50 and sufficient clearance is provided between cone 46 and plate 48 so that the operating or actuating arm 44 may successively engage pins 50 and thus move cone 46 one-tenth of a revolution for each full revolution of cone 36. Both cones 36 and 46 are provided with gear segments as 52 and 54 which are the engaging means for the reset mechanism.

In order to provide the initial driving energy for the registering mechanism, base 12 must be fixedly, or preferably, detachably secured to one of the revolving wheels of the golf cart. Further, the attachment should be so arranged that shaft 14 is in substantial alignment with the axis of revolution of the cart wheel. One convenient means for arranging for this attachment is to provide two fixed hooked members as 58 and 60 fastened to base 12. Medially disposed on the opposite side of base 12 from hooks 58 and 60 is an adjustable hook 62. A preferred arrangement is to use some form of cam lever locking means, as that indicated at 64, so that the two lower hook members can be engaged in appropriate holes in or over the rim of the wheel and then the device tightened in place through the operation of cam lever 64.

The actuating energy is supplied by pendulum 66. This unit is shown in full detail in Figure 6 and consists essentially of a heavy weighted arc-shaped portion 68 and a neck portion 70 which is provided with a through bore in which is seated, preferably, an antifriction bearing as indicated at 72. Resilient arresting members 74 and 75 are provided on either side of the heavily weighted portion 68. These resilient members are secured to the pendulum preferably by the slotted means illustrated in Figure 6. The purpose of these members is to cushion the rotation of the pendulum and bring it to rest against the rubber covered abutments 76 and 77 which are successively engaged, each revolution, as the device is revolved.

Figure 5:
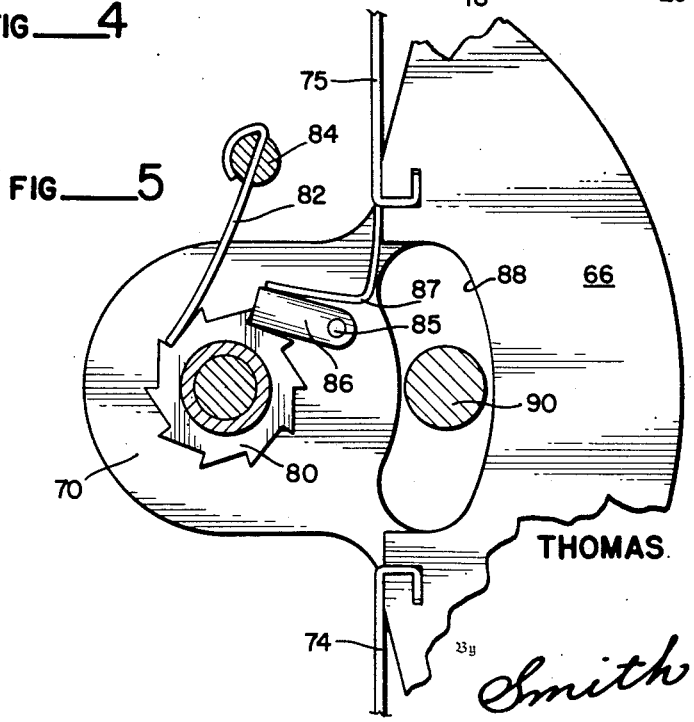
Figure 5 is a fragmentary plan view of the actuating pendulum of this device together with the other associated parts, some of which are shown in section as along the line 5—5, of Figure 3.

Formed as part of pulley 22 or fixedly secured thereto is a one-way ratchet 80. Adapted to engage ratchet 80 is a resilient pawl member 82 which is anchored at one end to boss 84 which is formed as part of base 12. The action of this member is best illustrated in Figure 5 and it is to be noted that in addition to providing a ratchet stop it also provides a friction tensioning means so as to at all times hold the ratchet in position. Pivotably secured as by pin 85 secured to pendulum 66 is operating pawl member 86. This member is spring urged as by spring 87 so that it at all times engages ratchet 80.

In the body of pendulum 66 is a slot 88 the longitudinal axis of which is concentric with the center of rotation of the pendulum. Disposed within this slot and formed preferably as part of base 12 is the stop post 90. This post, with the proper proportioning of slot 88, provides a positive limit stop for the movement of the pendulum. Under normal conditions it is not intended that this stop be called into use but in case of rough treatment, or high speed operation, or the failure of either of stop 76 or 77, then this slot provides a positive stop which will prevent serious damage to the interior mechanism of the device. Secured to the upper end of post 90 is the friction and stop clip 91. This clip is provided with a resilient U-shaped portion adapted to frictionally engage stop plate 92. Plate 92 has pivoted to it the gear segment and bell crank 94 which pivots about the through bolt or rivet 95. A driving pin for plate 92 is provided at 96. This pin rides in the arc-shaped slot 97, formed within cam plate member 98, which slot is concentric with the center of rotation of plate 98. Plate 98 has on its upper side an outstanding hub 99 which is cylindrically bored to fit over the upper reduced portion of pin 14 and itself is formed with an outer surface which is D-shaped in cross-section. This D-shaped portion is adapted to engage a mating D-shaped opening in the reset knob 100. Consequently any rotative effort applied to knob 100 will be transmitted to plate 98 and then through slot 97 and pin 96 to the stop or reset plate 92.

In order to fully enclose the mechanism and protect the same from dirt and the elements, a housing 102 is provided. This housing also carries three transparent windows 104, made preferably of plastic material, and these are spaced so as to provide a view of the essential numbers on each of the three counting cones 30, 36 and 46. In order that the error in reading be kept to a minimum, the housing is provided with the beveled portion which carries windows 104 and in this way the windows can be disposed close to the beveled surfaces of the numbered cones.

*Method of operation*

Assuming that this device has been suitably positioned on the wheel of a golf bag cart and the various dials have been set at zero, the device will begin to function immediately the cart is put into motion. The initial functioning will best be understood from Figures 2, 3 and 5. As the wheel begins to revolve the pendulum tends to remain in the position with its mass downwardly disposed as the entire unit except for the pendulum assembly immediately starts to turn. Assuming the unit is advancing in the direction of the arrow indicated in Figure 2, stop 76 advances around and finally compresses spring 74 and then begins to carry the pendulum around with the housing.

During this movement the ratchet pawl 86 which is pivotably mounted on pendulum 66 holds the ratchet 80 in a fixed position allowing the spring member 82 to rotate with the housing until it engages the next ratchet tooth. It is during this part of the cycle that the counting mechanism is rotated since the ratchet 80 and pulley 22 are rotating in relation to the housing and the rotation is carried by belt 24 to the first digit counter 30. In this position the pendulum is carried by stop 76 around with the housing until it has reached a point just beyond top center. The pendulum at this point begins to fall downwardly about its pivot shaft 14 faster than the housing is rotating until spring 75 comes in contact with stop 77. During this relative change in position spring 82 holds the ratchet 80 in fixed relation with the housing while pawl 86 is carried around with the pendulum to a position of engagement with the next ratchet tooth. The pendulum rotates in this position along with the housing until it reaches its approximately lowest point of revolution and the weight holds it in this position until it is again engaged by stop 76. If the wheel is rotated in the opposite direction, the same general action takes place except that during the initial movement of the housing, the pendulum remains motionless causing the ratchet to be advanced one tooth relative the ratchet pawl by the pressure applied on spring 82 and when the pendulum drops beyond top center, the ratchet is advanced by the pawl 86 and the spring 82 is brought into engagement with the following tooth. During this drop of the pendulum, in this case, the counting cone is advanced. In both cases, the counting cone is advanced a fraction of one digit, the exact amount being the ratio of the periphery of the wheel to which the device is attached and one yard. It is assumed, of course, that proper-sized pulleys 22 and 26 have been employed to compensate for the fact that the periphery of the wheel does not measure one yard. It will follow further that the actual number of ratchet teeth in ratchet 80 is immaterial as long as the mechanism produces a movement in dial 30 corresponding to a portion of a yard that the wheel has actually rolled on the ground surface.

The action of the counters 30, 36 and 46 has much in common with counting or tallying devices and they are arranged that the single digit counter for one revolution will move the two digit counter 36 one tenth of a revolution and in like manner the counter 36 moves the three digit counter 46 one tenth of a revolution for each complete revolution it makes. The same arrangement could be carried on through additional counters if the device were to be designed for measuring longer distances than three digits would represent. Counters 36 and 46 are held in place, against incidental rotation, by pressure springs 116 and 118 both secured to the fixed post 120.

Figure 2:
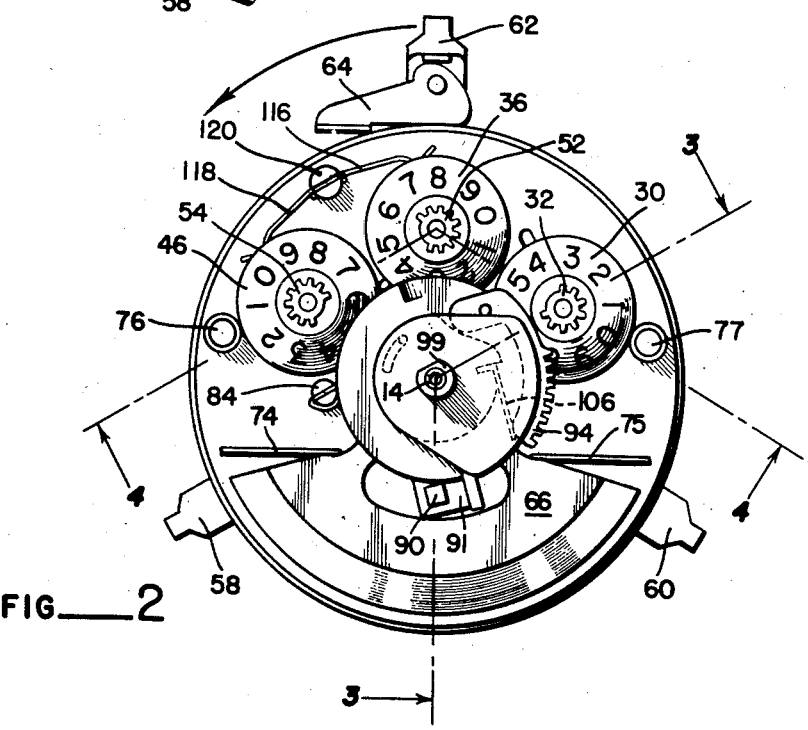
Figure 2 is a face view of this device with the enclosing housing removed.
Figure 3:
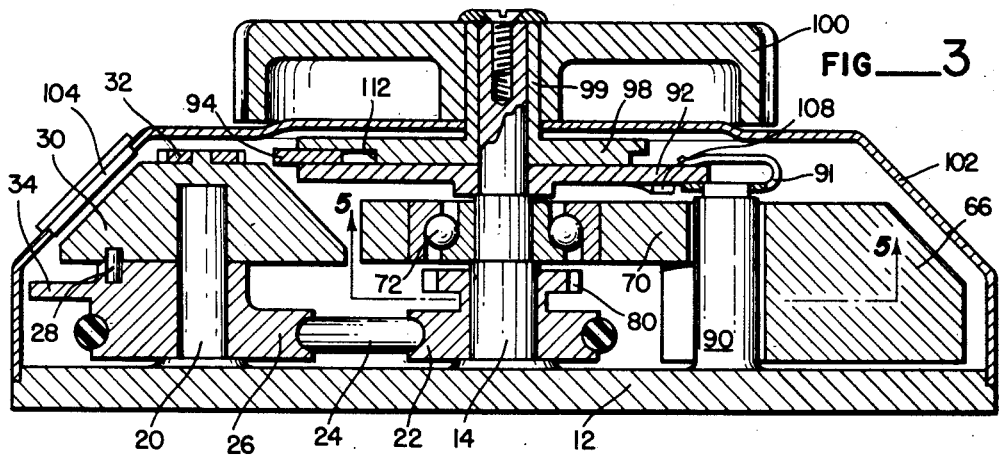
Figure 3 is an enlarged cross-sectional view taken along the broken line 3—3 of Figure 2.
Figure 4:
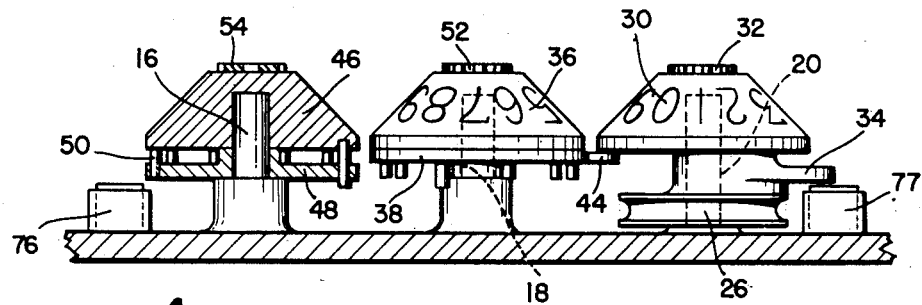
Figure 4 is a vertical sectional view, in fragmentary form, in which many of the parts have been removed to better illustrate the functioning of the counting or indicating cones, the view being taken along the broken line 4—4 of Figure 2.

After a distance has been measured and it is desired to measure a second distance the dials should be reset to zero and this is accomplished by turning reset knob 100 until stop 108 or 109 abuts stop clip 91. The essential parts are illustrated in Figures 2 and 7. As rotary effort is applied to knob 100 this movement is transmitted by the extended hub 99 forming part of plate 98. Initial movement of plate 98 moves pin 96 through slot 97 changing the relative positions of plate 98 and plate 92. In this changing of relative positions, the pivoted gear segment 94 is urged outwardly by spring 106. A continuation of the movement of the reset knob rotates plate 92 advancing gear 94, in turn, past each of the reset gears 32, 52 and 54 and they are turned back to a zero setting at which time the untoothed portion of the gears run off gear segment 94, each coming to the zero position because the untoothed portion is diametrically opposite zero on the dial. Plate 92 is frictionally engaged by the resilient clip 91 so that it takes considerable applied force to change its position and revolve it. This resists movement throughout the reset cycle and forces spring 106 to bias outward segment 94. Further, as plate 92 is provided with the opposed stops, 108 and 109, formed as part of plate 92, the rotary movement of plate 92 is limited to approximately one half turn and is terminated by one of the stops abutting the back portion 110 of clip 91. At this point knob 100 may be rotated in a reverse direction. Due to the length of slot 97 there is reasonable latitude of movement between plates 98 and 92; and, due to the frictional action of clip 91, this movement enables the cam portion 112 of plate 98 to engage the follower portion 114 of bell-crank gear segment 94 and positively withdraw the gear segment so that it can no longer contact reset gear of the counter. When this condition has been reached the device is then reset for a subsequent measuring operation. Reverse movement of knob 100 is limited when portion 110 of clip 91 abuts stop 108.

Counting cones 30 and 46, and pin-carrying plates 38 and 48 are are interchangeable for economy of manufacture. Counting cone 36 is substantially identical with counting cones 30 and 46 except for the order of numeral indices.

It is believed that it will be clearly apparent from the above description and the disclosure in the drawings that the invention comprehends a novel construction of a yardage reading device for attachment to a revolving wheel.

Having thus disclosed the invention, I claim:

1. A distance measuring device for attachment to a revolving wheel, comprising: a base; a main shaft positioned on said base; three counter supporting shafts positioned on said base and concentrically disposed around said main shaft; first, second and third digit counting cones, each rotatably mounted on one of said counter supporting shafts; reset gear segments on each of said counting cones; driving plates secured to said second and third digit counting cones having pins positioned concentrically about the center of said driving plates, said driving plate secured to said second digit counting cone having an actuating arm for engaging said pins on said driving plate secured to said third digit counting cone; a first pulley secured to said first counting cone having an actuating arm for engaging said pins on said driving plate secured to said second digit counting cone; a second pulley rotatably mounted on said main shaft and flexible drive means connecting said first and second pulleys; a ratchet secured to said second pulley; a pendulum pivotally mounted on said main shaft; a spring pressed operating pawl pivotally mounted on said pendulum in position to engage said ratchet in one direction; a resilient pawl member secured to said base member in position to engage said ratchet in the same direction as said operating pawl; abutment members limiting the swinging of said pendulum in either direction; means for securing said base member to a wheel; a housing mounted on said base and covering said counting cones having windows therein for reading said counting cones; a reset knob outside of said housing and pivotally mounted on said main shaft; a cam plate member pivotally mounted on said main shaft and secured to said reset knob; a stop plate pivotally mounted on said main shaft; a bell crank pivotally mounted on said stop plate having a gear portion for engaging said reset gear segments in its outward position; means connecting said cam plate and said stop plate permitting limited relative rotative movement therebetween; a friction and stop clip mounted on said base and bearing on said stop plate and two stop portions on said stop plate to engage said friction and stop clip and limit the rotation of said stop plate; and a spring on said cam plate to urge said gear portion of said bell crank outward during rotation of said reset knob in one direction, and a cam portion of said cam plate member to engage the follower portion of said bell crank and urge said gear portion inward during rotation of said reset knob in the other direction.

2. A measuring device for attachment to a revolving member, comprising: a base; a main shaft positioned on said base; three counter supporting shafts positioned on said base; first, second and third digit counting members, each rotatably mounted on one of said counter supporting shafts; driving plates secured to said second and third digit counting members and having pins positioned concentrically about the center of said driving plates, said driving plate secured to said second digit counting member having an actuating arm for engaging said pins on said driving plate secured to said third digit counting member; a first pulley secured to said first counting member having an actuating arm for engaging said pins on said driving plate secured to said second digit counting member; a second pulley rotatably mounted on said main shaft and an endless flexible drive means connecting said first and second pulleys; a ratchet secured to said second pulley; a pendulum pivotally mounted on said main shaft; a spring pressed pawl pivotally mounted on said pendulum in position to engage said ratchet in one direction; a spring pressed pawl secured to said base in position to engage said ratchet in the same direction as said pawl on said pendulum; abutment means limiting the swinging of said pendulum in either direction; and means for securing said base member to a wheel.

3. A measuring device for attachment to a revolving member, comprising: a base; a main shaft positioned on said base; a plurality of supporting shafts positioned on said base and concentrically disposed around said main shaft; counting members rotatably mounted on said counter supporting shafts; reset gear segments on each of said counting members; said counting members having means for transferring motion therebetween for counting; a cam plate member pivotally mounted on said main shaft; means for manually rotating said cam plate member during resetting of said measuring device; a stop plate pivotally mounted on said main shaft; a bell crank pivotally mounted on said stop plate having a gear portion for engaging said reset gear segments in its outward position; means connecting said cam plate and said stop plate permitting limited rotative movement therebetween; a friction and stop clip mounted on said base and bearing on said stop plate and two stop portions on said stop plate to engage said friction and stop clip and limit the rotation of said stop plate; a spring on said cam plate to urge said gear portion of said bell crank outward during rotation of said cam plate in one direction, and a cam portion of said cam plate member to engage the follower portion of said bell crank and urge said gear portion inward during rotation of said cam plate member in the other direction; and drive means connected to one of said counting members for imparting rotative movement thereto upon rotation of said base on such revolving member, said drive means permitting free rotation of the connected counting member in a subtracting direction.

4. A measuring device for attachment to a revolving member, comprising: a base; a main shaft positioned on said base; a plurality of counter supporting shafts positioned on said base and concentrically disposed around said main shaft; counting members rotatably mounted on said counter supporting shafts; reset gear means on said counting members; said counting members having single tooth drive means for transferring motion therebetween for counting; a cam plate member pivotally mounted on said main shaft; means for manually rotating said cam plate member during resetting of said measuring device; a stop plate pivotally mounted on said main shaft; a reset member pivotally mounted on said stop plate having a gear portion for engaging said reset gear means in its outward position; means connecting said cam plate and said stop plate; means on said cam plate to urge said gear portion of said reset member outward during rotation of said cam plate in one direction, and means on said cam plate member to engage said reset member and urge said gear portion inward during rotation of said cam plate member in the other direction; and counter drive means connected to one of said counting members for imparting rotative movement thereto upon rotation of said base on such revolving member, said counter drive means permitting free rotation of the connected counting member in a subtracting direction.

5. A measuring device for attachment to a revolving member, comprising: a base and a main shaft positioned on said base; a series of counter supporting shafts positioned on said base and concentrically disposed around said main shaft; a first, a second and a third counting member rotatably mounted serially on said counter supporting shafts; counter drive means connected to said first counting member for imparting rotative movement thereto upon rotation of said base on such revolving member; said counting members having means for transferring motion therebetween for counting including a single tooth extending from said first and second counting members to engage said second and third counting members respectively; a reset gear segment centered on each of said counting members; and means for resetting said counting members including a gear segment connected to said main shaft and disposed to follow a circular path of travel centered at said main shaft in which said gear segment contacts said reset gear segments of said first, second and third counting members in that order and manually operable mechanical means for moving said gear segment in said path of travel to reset said first, second and third counting members in that order.

THOMAS A. HUTSELL.

References Cited in the file of this patent

UNITED STATES PATENTS

| Number | Name | Date |
|---|---|---|
| 198,786 | Beeson | Jan. 1, 1878 |
| 248,380 | Woodruff | Oct. 18, 1881 |
| 396,210 | Johnson | Jan. 15, 1889 |
| 464,982 | Musselman et al. | Dec. 15, 1891 |
| 514,897 | Bateman | Feb. 20, 1894 |
| 657,578 | Wernert | Sept. 11, 1900 |
| 718,104 | Dixon | Jan. 13, 1903 |
| 1,019,058 | Lees | Mar. 5, 1912 |
| 1,058,938 | Baumgaertner | Apr. 15, 1913 |
| 1,215,219 | Trinks | Feb. 6, 1917 |
| 1,261,449 | Slye | Apr. 2, 1918 |
| 1,873,106 | Blalock | Aug. 23, 1932 |
| 2,077,666 | Bliss | Apr. 20, 1937 |
| 2,087,093 | Marquart | July 13, 1937 |
| 2,363,737 | Machado | Nov. 28, 1944 |

FOREIGN PATENTS

| Number | Country | Date |
|---|---|---|
| 4,258 | Great Britain | Oct. 24, 1878 |
| 26,360 | Great Britain | Nov. 13, 1909 |